H. G. YATES.
Pneumatic Railway Cars.

No. 142,605.  Patented September 9, 1873.

Attest
Calvin Nash
A. H. Evans

Inventor
Henry G. Yates
Per A. H. & R. K. Evans
Attys

UNITED STATES PATENT OFFICE.

HENRY G. YATES, OF KALAMAZOO, MICHIGAN.

IMPROVEMENT IN PNEUMATIC-RAILWAY CARS.

Specification forming part of Letters Patent No. 142,605, dated September 9, 1873; application filed April 18, 1873.

*To all whom it may concern:*

Be it known that I, HENRY G. YATES, of Kalamazoo, in the State of Michigan, have invented a new and useful Improvement in Railway-Cars, of which the following is a clear, full, and exact description, reference being had to the accompanying drawings, in which—

Figure 1:
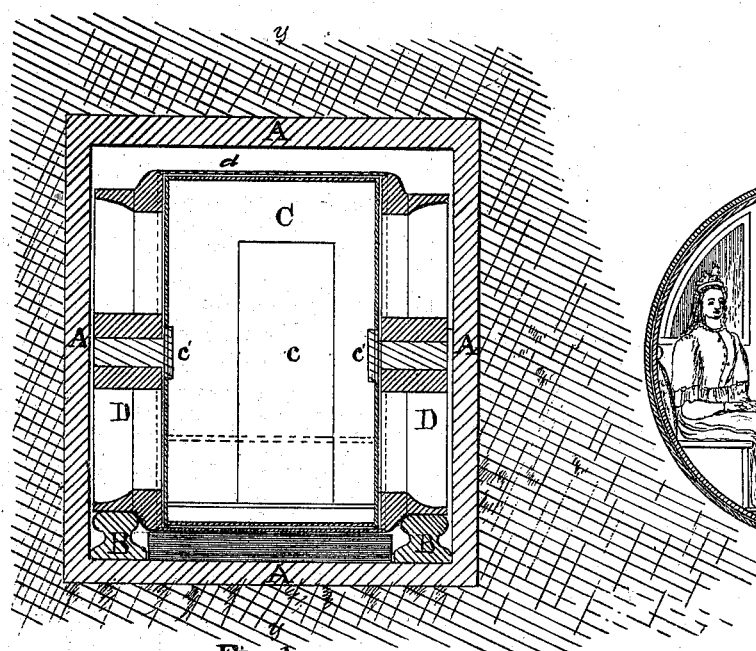
Figure 2:
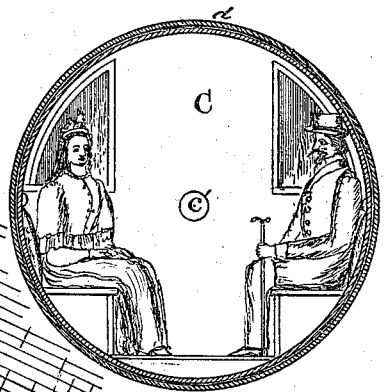
Figure 3:
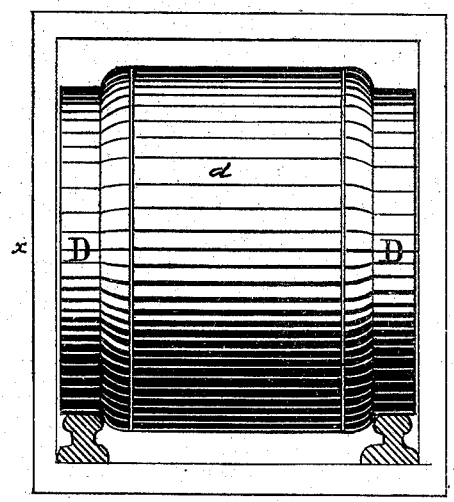
Figure 4:
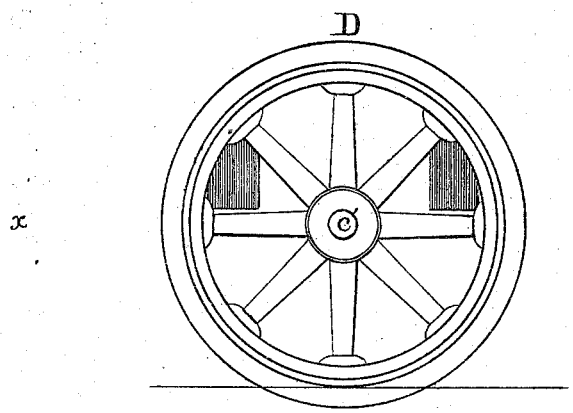

Figure 1 represents a cross vertical section; Fig. 2, an end view of the interior of the car. Fig. 3 is a rear view of the car. Fig. 4 is a detached view of a wheel.

My invention has reference to that class of cars designed for use on pneumatic railways; and consists in a peculiar construction of the car, which adapts it to the transportation of freight or passengers. I secure capacity for freight and comfort for passengers. The body of the car is held in proper position, and it retains its center of gravity while the wheels are moving rapidly in their line of travel, propelled by a current of air through the tube or passage-way, which is constructed rectangular in order to admit the passage of the car. I use no vacuum, and thereby avoid any and all danger from collapse of the tube.

In order to enable others skilled in the art to make and use my invention, I will proceed to describe the exact manner in which I have carried it out.

The tube or passage-way A A is square, as shown in Fig. 1, and constructed of any suitable material, iron being preferred, and on each side of the bottom are secured the tracks B B, of the ordinary iron rails. The wheels D D are made of a size to fit snugly between the rails and the top of the tube, sufficient room only being left to allow the necessary play for the wheels and avoid striking the roof. These wheels are constructed with the usual flanges to suit the rails, but are made with spokes, and not solid, in order to admit light into the car through windows provided for that purpose. These wheels are also connected together by the hollow rim $d$, as shown in section in Fig. 1, whereby they become virtually a hollow cylinder rolling over the track. Through the side of the cylinder $d$ is a door for reaching the door of the car within. The position of doors when the car stops is under the control of the brakeman within the car. The body of the car C is also cylindrical, of a corresponding shape to the outside cylinder above described, and fitting loosely within it, as shown in Fig. 3. The cylindrical car is suspended at a central point at each end upon pivots $c'$, extending inward from the centers of the wheels D D, and are allowed to play freely on these pivots, by which means the center of gravity in the car is maintained while the wheels to which it is attached are rapidly revolving.

It is evident from this description that passengers entering the car C would not be disturbed in their seats by the revolutions of the outside cylinder $d$, but would retain their position as if traveling in the ordinary railways.

I am aware that pneumatic tubes have been used for the transmission of small parcels by means of a vacuum and the expansion of air; but such is not my invention. The open spaces on each side and around my car allow the air to pass from the rear to the front of the car, and produce a current of air through the tube or passage-way A. It is the current of air thus produced that I claim will drive my car along its line of travel.

Having now fully described my invention, what I claim as new, and desire to secure by Letters Patent, is—

The railway-car C, connected with its wheels D D by the independent journals $c'$ $c'$ and cylindrical connection $d$, constructed substantially as and for the purpose described.

HENRY G. YATES.

Witnesses:
CALVIN NASH,
R. K. EVANS.